Nov. 20, 1951
N. C. PRICE
2,575,682
REACTION PROPULSION AIRCRAFT POWER PLANT
HAVING INDEPENDENTLY ROTATING COMPRESSOR
AND TURBINE BLADING STAGES
Filed Feb. 14, 1944
2 SHEETS—SHEET 1
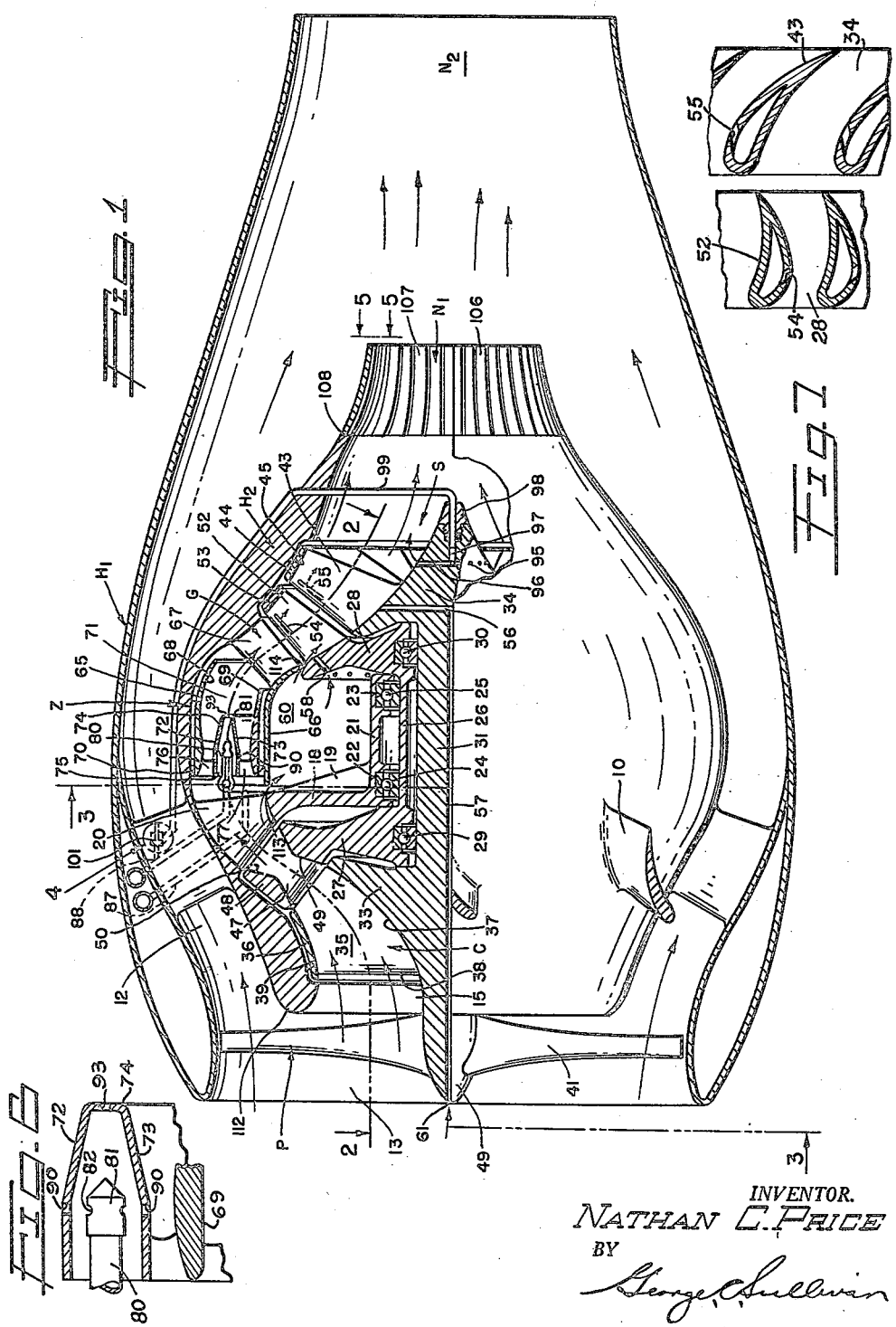
INVENTOR.
NATHAN C. PRICE
BY
George Sullivan
AGENT

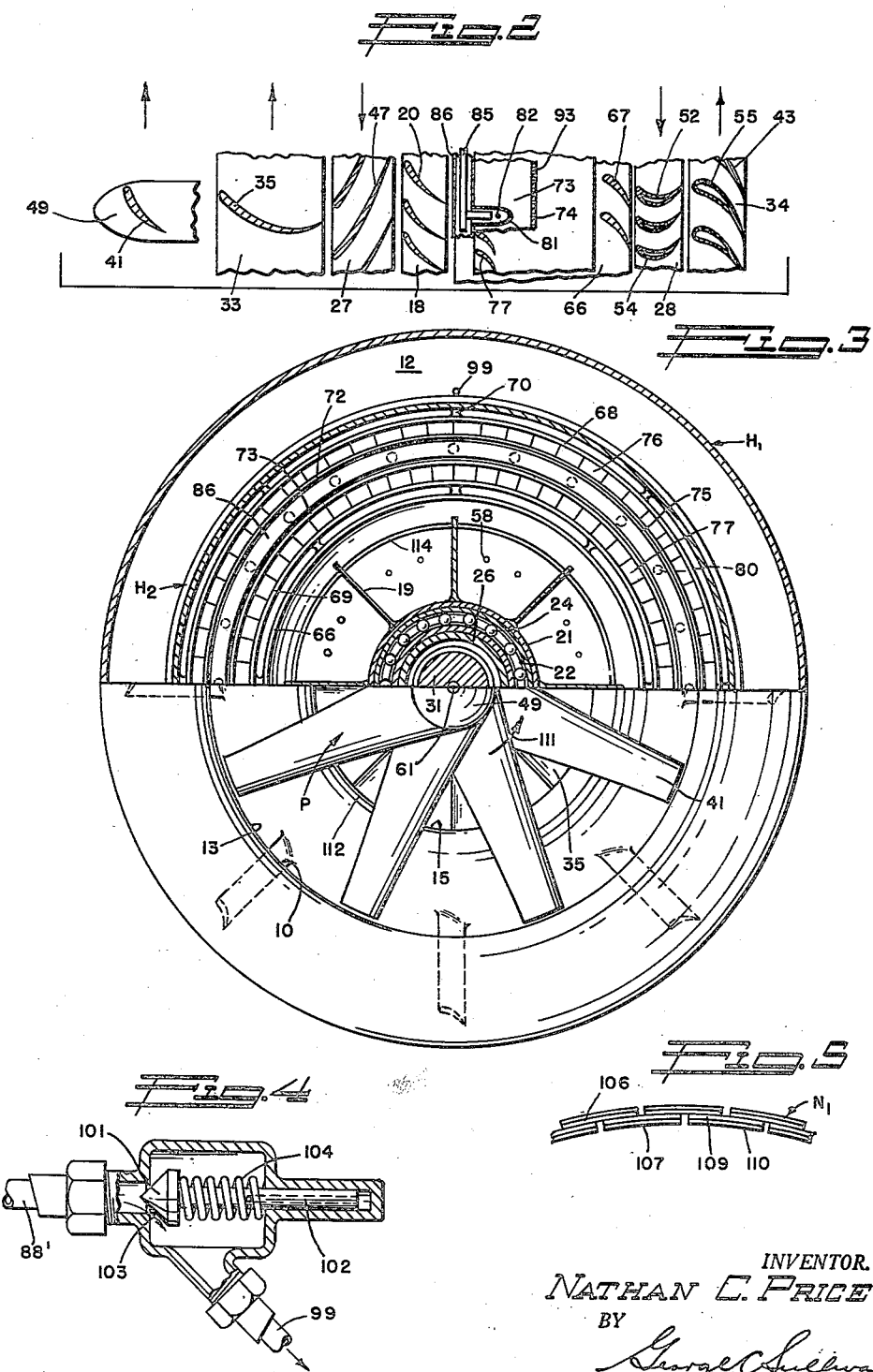

Patented Nov. 20, 1951

2,575,682

UNITED STATES PATENT OFFICE 2,575,682

REACTION PROPULSION AIRCRAFT POWER PLANT HAVING INDEPENDENTLY ROTATING COMPRESSOR AND TURBINE BLADING STAGES

Nathan C. Price, Hollywood, Calif., assignor to Lockheed Aircraft Corporation, Burbank, Calif.

Application February 14, 1944, Serial No. 522,343

6 Claims. (Cl. 60—35.6)

This invention relates to prime movers of the fluid reaction type in general, and more particularly to the internal combustion-reaction types of engines which function in accordance with the principal and in the manner commonly known as "jet propulsion."

This invention may be adapted to numerous uses but finds its principal application in prime movers for propelling aircraft and the like high velocity vehicles, particularly for airplanes of medium weight and medium high speed. It also brings into the realm of feasibility the installation of jet power in aircraft which travel at relatively low speed, without entailing the loss of efficiency and the attendant cruising range limitations which have been heretofore predicted for jet propulsion under such conditions.

It is an object of this invention to provide a propulsion unit which does not possess the efficiency and space requirement limitations inherent in the conventional propeller drive apparatus and which, at the same time, does not suffer limitations as a result of operation of the aircraft at medium speeds or through a large range of speeds.

It is a further object of this invention to provide a gas turbine and compressor combination of improved design wherein increased thermal efficiency and mechanical simplification is accomplished with attendant reduction of weight.

It is also an object of this invention to provide a fluid jet propulsion unit which embodies high internal thermodynamic and mechanical efficiency combined with low jet wake losses for medium high speed or lower speed aircraft, in order to improve airplane performance and to increase the range of operation.

The objects of this invention are attained in general by providing a power plant which produces propulsive force and work wholly or in part by means of the reaction of a medium velocity expansible fluid jet of relatively large weight flow. The attainment of the objects and advantages of this invention are realized in part by an improved design of the turbo-supercharger combination wherein each of the plurality of compressor stages is individually and independently driven from each of the plurality of turbine stages resulting in improved thermal and mechanical efficiency and weight reducing simplification of the mechanical components.

The object of the invention is also attained by a supercharger compressor rotor designed for increased efficiency, particularly at supersonic fluid velocities.

These and other objects and features of novelty will become evident hereinafter in the description which together with the following drawings illustrate preferred embodiments of the invention.

Figure 1 is a longitudinal sectional elevation of th power plant assembly.

Figure 2 is a fragmentary, longitudinal sectional view of irregular path taken on line 2—2 of Figure 1.

Figure 3 is a frontal view of the power plant, part in section and part in elevation, taken on line 3—3 of Figure 1.

Figure 4 is an enlarged detailed view of the valve shown at 4 in Figure 1.

Figure 5 is an enlarged, fragmentary, rear elevation of the nozzle taken on line 5—5 of Figure 1.

Figure 6 is an enlarged fragmentary sectional view of the fuel nozzle means of the combustion chamber.

Figure 7 is an enlarged sectional view of two adjacent turbine blades.

Referring now to the drawings, in which like reference numerals refer to corresponding parts throughout the several figures, the apparatus of the invention is as follows:

The power plant assembly, as shown in the drawings, comprises nine main components: namely, an outer streamlined housing $H_1$, an inner streamlined housing $H_2$ supported substantially concentrically within the outer housing, and in the inner housing a counter-rotation, mixed axial and radial flow turbo-compressor C, a counter-rotational mixed axial and radial flow gas turbine G, an annular combustion chamber Z interconnecting the compressor and the turbine, a secondary combustion zone S, a primary discharge nozzle $N_1$, secondary propulsion nozzle outlet $N_2$, and an induction propeller P.

The inner streamlined housing $H_2$ which contains the principal components of the apparatus is, as before stated, concentrically supported within the outer tubular housing $H_1$ by means of a plurality of interconnecting streamlined struts or vanes 10 to form between said outer housing $H_1$ and inner housing $H_2$ a subtantially annular shaped passageway 12 of convergent-divergent cross-sectional area. The outer hollow streamlined housing $H_1$ is provided with a forwardly directed inlet opening 13 and a contracted rearwardly directed outlet or nozzle $N_2$. This housing may be fabricated from formed "Durolumin" or stainless steel sheet. The inner streamlined housing $H_2$ is similarly provided with a forwardly directed inlet 15 and a rearwardly directed discharge nozzle $N_1$, said rearwardly directed nozzle $N_1$ being positioned coaxially within and adjacent to the outlet $N_2$ of the outer housing $H_1$, the two nozzles, in operation, functioning as a nozzle and augmenter respectively. The forward portion of housing $H_2$ may be cast "Duralumin" and the rear portion cast heat resistant alloy steel.

Within the inner streamlined housing $H_2$, a structure is provided for rotationally supporting the interconnecting drive shafts of the compressor and turbine, said compressor and turbine being more fully described hereinafter. The inner supporting structure comprises a longitudinal disc or diaphragm member 18 having a plurality of radially extending stiffening webs 19. The diaphragm 18 is supported at its outer periphery by means of a plurality of radial vanes 20 which form the stationary or static discharge diffusion nozzle ring portion of the compressor C, hereinafter more fully described, which vanes are in turn attached at their outer extremities to the inner housing wall structure adjacent the zone of the inner termination points of the beforementioned supporting vanes 10. The inner diaphragm 18 is thus supported from the outer housing by means of the supporting vanes 10 and the compressor discharge nozzle vanes 20. The inner or central portion of the diaphragm 18 and webs 19 carry a coaxially positioned tubular shaped bearing supporting member and shaft housing 21 having a pair of longitudinally spaced annular recesses 22 and 23 adapted to retain a pair of suitable bearings such as the radial ball bearings shown at 24 and 25. Plain or slipper types of segmental bearings may be optionally employed.

Concentrically positioned within the tubular shaft housing 21 and rotatably supported within the beforementioned radial ball bearings 24 and 25 is a tubular shaft 26 which interconnects a compressor rotor 27 and a turbine rotor 28. At the forward and rearward end portions of the shaft 26, within the rotors 27 and 28, is another pair of suitable bearings, such as the radial ball bearings shown at 29 and 30 which in turn carry a centrally positioned shaft 31 which serves to interconnect the compressor rotor 33 and the turbine rotor 34. The first stage compressor rotor 33 and the final stage turbine rotor 34 are thus independently interconnected by the said central shaft 31 which is centrally positioned and rotatably journaled within the tubular shaft 26 upon the beforementioned bearings 29 and 30, and the tubular shaft 26 interconnecting the second stage compressor rotor 27 with the first stage turbine rotor 28 is in turn concentrically journaled and supported for independent rotation within the supporting bearings 24 and 25 within the housing 21.

On the forward end portion of the central shaft 31, as before mentioned, is located the first stage compressor rotor 33 of approximately conical shape and carrying a plurality of radially extending airfoil shaped impeller vanes 35 terminating at their outer tip ends in a curved enclosing ring or shroud 36. The inner opposite curved surfaces 37 of the impeller rotor 33 and the shroud 36 are shaped as shown to have a forwardly directed, axial inlet opening 38 registering with the housing inlet opening 15 leading to the impeller blades 35 and to form a following mixed axial and radial flow passage therebetween which discharges into the second counter-rotating stage. The curved shroud 36 rotates with the impeller blades to which it is attached, within a curved annular recess 39 provided in the inside surface of the forward end portion of the beforementioned inner streamlined housing $H_2$. On a forward extension of the shaft 31 and the rotor 33 a hub 49 is formed and adapted to carry a plurality of radially extending airfoil sectioned impeller blades 41 which constitute the induction blower or propellel P. On the rearward end portion of the central shaft 31, as beforementioned, is located a conical shaped turbine rotor 34 which carries a plurality of radially extending airfoil shaped turbine impeller blades 43 terminating in an annular ring or shroud member 44 which rotates within an annular recess 45 formed in the inside surface of the rear portion of the streamlined housing $H_2$. The turbine rotors may be constructed of heat resistant chromium-nickel-iron alloy and the turbine impeller blades of heat resistant tungsten-cobalt-chromium alloy.

The beforementioned second stage compressor rotor 27 located on the forward end of the tubular shaft 26 carries on its outer periphery a plurality of curved impeller vanes 47 which extend radially intermediate the said rotor 27 and a ring shroud member 48 which rotates adjacent the first stage shroud 36 within an extension of the recess 39. The outer surface 49 of the rotor 27 and the inner surface 50 of the shroud 48 form a fluid flow passage with a convergent inlet and a divergent outlet which results in a contraction or throat section having the appearance of a venturi as viewed in the longitudinal cross-section shown in Figure 1. This Venturi shaped passage containing the radially inter-extending impeller or diffuser blades which are set at low angles of incidence with respect to the direction of rotation and with respect to the entering fluid, as best shown in Figure 2, constitutes, in operation, a counter-rotating supersonic diffuser.

The diffuser and rotor 27 should in most cases be constructed of heat treated steel, rather than the light metals used in conventional superchargers, because the pressure ratio and resultant temperature ratio developed are much higher, which might result in creep difficulties in light metals.

On the rear end portion of the tubular shaft 26 is located the beforementioned first stage turbine rotor 28 which carries a plurality of radially extending airfoil shaped impeller blades 52 terminating at their outer tip portions in an annular shroud member 53 which is adapted to rotate with the blades within the beforementioned recess 45.

The first and second stage turbine impeller blades 52 and 43 are hollow and are provided with slits 54 and 55 opening from the interior of the blades to the outer convex or anti-lift surfaces thereof at points preferably adjacent the tips and near the leading edges, the slots being formed in general in accordance with that shown and described in my copending application Serial No. 488,029, now Patent No. 2,468,461, issued April 26, 1949. Suitable radial cooling air passages 56 connecting with the interior hollows of each of the blades 43 are provided in the rotor 34 making connection centrally with a bore passage 57 leading axially through the central shaft 31 to an inlet opening 61 in the forward tip of the hub 49. Similar passages of shorter length are provided through the outer peripheral portion of the turbine rotor 28 as shown at 58 which lead into the interior hollows of each of the first stage turbine impeller blades 52. The passages 58 make connection with the interior cavity 60 of the unit adjacent the supporting diaphragm 18 and inside of the inner wall of the combustion chamber.

An annular shaped combustion chamber Z formed between the inner surface 65 of an intermediate section of the housing H₂ and an inner concentric annular wall member 66, is located between the compressor and the turbine and serves to interconnect them. The said inner wall member 66 of the combustion chamber is supported at its rearward, inwardly curved end at the discharge end of the combustion chamber by means of the plurality of semi-radially and axially positioned curved vanes 67 which constitute the turbine inlet nozzle. The nozzle vanes 67 have a sloping entrance angle parallel to the swirl angle of the combustion chamber gases to receive these gases without shock, and terminate at an exit angle of about 13° from the tangent. A small radial gap or slot 113 is formed between the forward end of partition 66 and the diaphragm 18 interconnecting the entrance of the combustion chamber with the cavity 60 for passage of cooling air as hereinafter more fully described. Within the combustion chamber Z are a pair of concentrically positioned annular shroud members 68 and 69, both preferably fabricated from a heat resistant material such as nickel-chromium-iron alloy, spaced a short distance from the walls 65 and 66 respectively to form narrow, annular air passages therebetween and to enclose a combustion zone 71. The combustion chamber Z into which the compressor discharges through diffuser vanes 20 is thus an approximately annular shaped space, curved inwardly and of slightly diminished average diameter towards its outlet end and defined on the outside by the beforementioned inner surface 65 of the intermediate portion of the housing H₂ and on the inside by the concentric, substantially annular shaped partition or wall 66. The combustion chamber Z converges slightly at the rear portion to the annular nozzle forming an outlet passage of reduced and restricted area and containing in the portion of reduced area the nozzle ring structure containing the beforementioned plurality of circumferentially spaced radially positioned airfoil shaped vanes 67.

The beforementioned inner and outer annular shroud members 68 and 69 are supported from the outer surface 65 of the combustion chamber Z by means of a plurality of circumferentially spaced positioning lugs or struts shown in Figures 1 and 3 at 70. Within the forward portion of the combustion zone centrally located between the shroud members 68 and 69 is a relatively short annular member formed with two concerging walls 72 and 73 joined in an apex at the rearward edge at 74 and opening forwardly as shown at 75 to form a fuel spray nozzle housing. The said walls 72 and 73 of the fuel nozzle housing are supported between and join the inner forward surfaces of the shrouds 68 and 69 by means of inner and outer concentric sets of a plurality of circumferentially interconnecting swirl vanes 76 and 77. The swirl vanes have an exit angle of about 25° to the tangent. Two vaned concentric annular inlet passages are thus formed at the entrance of the combustion zone on either side of the fuel nozzle housing 72—73 between the shrouds 68 and 69 which are adapted to impart a spiral flow to fluid flowing through the combustion zone.

A plurality of fuel spray jets 80 extend into the forwardly opening portion of the central annular nozzle housing formed between the beforementioned converging walls 72 and 73 and each spray jet carries at the inner end a spray head 81 provided with a pair of laterally directed orifices 82. Each said spray head is supported by and adapted to be supplied with a mixture of liquid fuel and injection air by means of a pair of concentric pipe nipples which make connection with concentrically arranged circular pipe manifolds 85 and 86 contained within the forward end of the combustion chamber. The exterior circular manifold 86 is adapted to be supplied with air under suitable pressure through a lead-in pipe 87 and the interior manifold 85 is adapted to be supplied with liquid fuel under pressure through a lead-in pipe 88. The lead-in or supply pipes 87 and 88 may enter the inner housing from suitable sources of supply under pressure through one or more of the supporting vanes or struts 10.

The beforementioned converging walls 72 and 73 of the nozzle housing between which the fuel spray jets extend, are provided with apertures 90 registering with each of the beforementioned laterally directed jet head orifices 82 whereby an atomized mixture of fuel and air may be projected laterally into the adjacent space in the contracted portion of the Venturi shaped air passages which lead into the combustion zone 71. A plurality of perforations 93 are provided in the apex 74 of the nozzle housing 72—73 for flow therethrough of a relatively small quantity of cooling air.

A plurality of apertures are provided in the gas turbine rotor 34 as shown at 95 for the introduction of a spray of supplementary fuel into the turbine exhaust passage. The orifices 95 are adapted to be fed with fuel through a plurality of lateral ducts 96 which extend radially from a central bore 97 in the tail portion of the central shaft and rotor 34 which in turn makes connection through a suitable stuffing box 98 with a fuel supply pipe 99. The fuel supply pipe 99 is connected to a branch fitting on the beforementioned main fuel line 88 through a spring loaded valve as indicated at 4 in Figure 1 and best shown in detail in Figure 4. The spring loaded valve comprises a conical valve member 101 slidably supported upon a stem 102 and urged into a closed position against beveled seat 103 by means of a coil spring 104. The valve is thus normally maintained closed against fluid pressure in pipe 88'. Upon application of pressure to pipe 88 and 88' above a predetermined maximum, the pressure acting against the face of the valve 101 causes it to open against the force of the spring 104 allowing fuel to flow through pipe 99 to the supplementary fuel injection spray orifices 95.

At the rear or trailing portion of the inner housing H₂ is a nozzle structure N₁ formed by a plurality of overlapping bi-metal leaves as best shown in Figure 5 at 106 and 107. The forward end of the bi-metal leaves are rigidly attached in a suitable manner such as by riveting or welding to the housing H₂ at 108. The rearward ends of the leaves are free to move outwardly to increase or inwardly to decrease the area of the nozzle opening in accordance with the differential expansion and contraction of the surfaces of the bi-metal leaves. Each nozzle leaf is constructed of two superimposed laminations 109 and 110 joined face to face as shown. The joined laminations in each leaf are composed of different kinds of metal alloys having widely different coefficients of expansion, such as, for example, high expansion 18% chromium 8% nickel steel in lamination 110, and low expansion 25% chromium 12% nickel steel in lamination 109. The first alloy steel has an expansion approximately twice that of the latter. The nozzle just described is claimed in my copending divisional application Serial No. 602,289 filed June 29, 1945, now Patent No. 2,563,270.

The operation is as follows:

The propeller P which may be 18" in diameter, in a representative case, and the initial stage compressor rotor 33 and vanes 35 are driven during rated power operation at approximately 10,500 R. P. M., for example, in a counter-clockwise direction as indicated by arrow 111 as viewed from the forward end in Figure 3. The said propeller P and rotor 33 are driven through the central shaft 31 by the last stage of the gas tubine which comprises the rotor 34 and impeller blades 43. The propeller thus operated is capable of inducting approximately 45 lbs. of air per second at sea level with a pressure rise ratio exceeding approximately 1.12 to 1.0. The second stage of the compressor comprising the rotor 27 and the impeller diffuser vanes 47 is ordinarily driven at approximately 22,000 R. P. M. for example, in a clockwise direction, counter to that of the beforementioned first compressor stage, through the concentric tubular shaft 26 by the first stage of the gas turbine comprising the rotor 28 and imimpeller blades 52. The specified rotative speeds will vary to some extent, depending on conditions imposed upon the power plant, as will be later described. In operation in an aircraft moving at high velocity, rammed air enters the forward opening 13 of the unit under pressure or if the unit is moving at lower velocities or is stationary, air is drawn into the forward opening 13 by means of the propeller P where the stream is initially divided by the leading edge 112 of the inner housing H₂. A portion of the air flows outside of the inner housing through the annular space 12 formed between the inner and outer housings H₁ and H₂ and thence rearwardly to be finally discharged from the outlet N₂ together with comingled combustion gases, as hereinafter more fully described. The other portion of the divided air entering the forward end of the unit passes into the opening 15 and into the first stage 35 of the compressor C. Air discharged from the first stage 35 of the compressor passes into the countter-rotating converging-diverging diffuser rotor section 47 and thence through the stationary or static diffuser vanes 20 into the forward entrance end of the combustion chamber Z at a pressure of approximately 105 pounds per square inch absolute, at sea level.

Under normal operation the convergent domain of the diffuser receives air at supersonic velocity relative thereto of approximately 1800 feet per second for example, such air being compressed by the reduction of the free passage area in the direction of flow. The air reaching the diffuser throat is raised in pressure by the preceeding convergent domain, to such an extent that the relative velocity of the air leaving it has been lowered to the velocity of sound. Thus beyond the diffuser throat, in the divergent portion, further diffusion and consequent increase of air pressure proceeds at sub-sonic relative velocity.

The air thus compressed is discharged into the combustion chamber and is again divided several ways, a major portion flowing through the two concentric annular inlet passageways containing the swirl vanes 76 and 77 formed between the shrouds 68 and 69 and located on either side of the fuel spray nozzle housing 72—73 and thence through the Venturi shaped passageway into the combustion zone 71. Another portion of the air passes between the combustion zone shrouds 68 and 69 and the combustion zone walls 65 and 66 for cooling. Still another minor portion of the air passes around the manifold piping 86 and through the converging passageway formed within the spray nozzle housing 72—73 and thence through perforations 93 into the combustion zone 70. A small quantity of air escapes inwardly through the slot 113 into the inner cavity 60 for cooling of the internal structure and the turbine rotor and blades, as hereinafter described. Liquid fuel such as, for example, gasoline, kerosene, or the like, introduced into pipe 88 under pressure from a suitable source not shown, issues from the orifices 82 together with atomizing air introduced into pipe 87 under pressure and passes laterally out through apertures 90 in the form of a spray into the beforementioned Venturi shaped air passages where it meets and mixes with the flowing air stream, and the resulting fuel-air mixture passes onward into the combustion zone 70 where combustion takes place. Combustion may be initiated by a spark plug or glow plug in the manner described in my said Patent No. 2,468,461. The swirl vanes 76 and 77 at the entrance to the venturi shaped air passages leading to the combustion zone 71 impart a spiral flow pattern to the burning atomized fuel-air mixture flowing through the annular space of the combustion zone. A more thorough mixing of the fuel and combustion air is thus effected by the added turbulence of the spiral flow and at the same time the effective length of the combustion chamber is increased by the greater length of the spiral combustion flame the combustion zone is thereby able to accommodate. This permits, in effect, a shorter length of combustion chamber for a given degree of mixing and heat generating capacity than would otherwise be possible.

The resultant heated products of combustion and excess air under the combustion zone pressure of about 105 pounds per square inch absolute are discharged through the outlet nozzle formed between the nozzle vanes 67 and thence pass into the expansion zone of the gas turbine where counter-rotative impulsion is given to the two rows of impeller blades 52 and 43. The partially expanded gases exhausted from the gas turbine are finally discharged in the form of a jet through the variable opening nozzle N₁ where they comingle with and give impulse to the beforementioned air flowing rearwardly through the annular passage 12 between the inner and outer housing. The comingled discharged gases and air are finally discharged rearwardly through the outlet nozzle N₂ in the form of a reactive jet. When added thrust or increased power is desired an increase in the fuel pressure in the supply pipe 88 above a predetermined value results in the opening of the spring loaded valve 101 to allow fuel to flow through pipe 99, stuffingbox 98 and thence through lateral ducts 96 in the turbine rotor 34 leading to the orifices 95 to spray fuel into the gases exhausted from the gas turbine and flowing through the secondary combustion one S. Combustion of the supplementary fuel thus sprayed into the discharged gases containing excess unconsumed oxygen, from the turbine results in augmented velocity and increased temperature of gases passing out through the nozzle $N_1$. The resultant increase in the temperature of the gases passing through the nozzle $N_1$ causes the bi-metal leaves 106—107 to bend outwardly by the combined pressure and differential thermal expansion effect, to cause an increase in the diameter and area of the nozzle opening. This increase in nozzle area automatically accommodates the increased gas volume without increased back pressure on the turbine, which would otherwise result in drop in rotative speed, and the consequent diminishing of the available thrust from the plant.

As beforementioned, a portion of the compressed air discharged from the compressor C into the entrance of the combustion chamber Z, escapes through an annular slot 113 leading into the cavity 60 surrounding the shaft 21 and defined by the combustion chamber wall 66, and from there escapes through the plurality of passages 58 leading through the rotor into the hollows of the first stage turbine impeller blades 52 for cooling, and finally the air passes out from the blades 52 through the boundary layer control slots 54 and into the combustion gases passing through the turbine expansion zone. Another portion of the air escapes from the cavity 60 through the annular passage 114 formed between the forward edge of the turbine rotor 28 and the lower discharge lip of the turbine inlet nozzle and passes into the expansion zone of the gas turbine in the form of a relatively thin boundary layer which flows along the surfaces of the gas turbine rotors 28 and 34 and finally comingles with the gases discharged from the gas turbine through the nozzle $N_1$. Cooling air also enters the hollows of blades 43 of the second stage of the gas turbine by way of the shaft bore 57 and the lateral passages 56 in the rotor 34. Air thus entering the blades 43 is discharged through the slots 55 in the manner before described in connection with the turbine impeller blades 52. Circulation of the air into the impeller blades 43 is induced in part by the ramming effect of the air meeting the entrance 61 of the bore 57 when the unit is in motion and also by reason of the centrifugal force action upon the bodies of air in the lateral passages 56 and in the hollow blades 43, when they are rotating at high speed.

The propeller P inducts into the unit and causes ejection of a large reactive mass flow of comingled combustion gases and air from the nozzle $N_2$, thereby increasing the performance of the unit by providing a resultant large jet thrust. The additional load imposed upon the last stage turbine impeller blades 43 by the propeller P requires the gas turbine to operate with a relatively low back pressure, which proportionately avoids excessive jet wake losses from the nozzle $N_1$.

The internal efficiency of the unit is benefited by utilization of a counter-rotation turbo-compressor mechanism comprising a principal part of the unit, which while simple and compact provides adequate ratios of compression in the compressor or supercharger and also subsequent large expansion in the gas turbine as compared to conventional turbo-compressor machines.

The counter-rotation elements of the turbo mechanisms are adapted to operate at a very high relative velocity (approximately 1,800 feet per second) with respect to each other without entailing the structural difficulties associated with the usual high rotational speeds heretofore required. High energy interchange in a small space is thus made possible since supersonic relative velocity thus exists between these elements, and the attainable ratios of compression or expansion under supersonic flow are very high compared to sub-sonic operation. In both compressor and turbine, a high rate of energy interchange is achieved with a minimum number of stages by virtue of high relative velocity between counter-rotating elements, whence the total surface area of the aerodynamic surfaces therein is less and the boundary layer frictional losses are therefore less.

The additional fuel injection at the orifices 95 in the turbine exhaust stream provides for increased thrust to be used during takeoff or for a sudden burst of power. The flow area of the propulsive nozzle $N_1$ is automatically adjustable to prevent variations in thermal conditions in the secondary combustion chamber S between the turbine and nozzle $N_1$ as a result of supplementary fuel injection or other causes, from interfering with the proper degree of expansion of gas through the turbine which is necessary to drive the supercharger-compressor C and propeller P.

The nozzle $N_1$ spouts combustion gases at a velocity which is considerably higher than the average resultant velocity of the mixed air and combustion gases finally issuing from nozzle $N_2$. A jet augmentation effect is thereby produced by the action of the jet of gases issuing from nozzle $N_1$ acting upon the inducted air stream flowing from the propeller P between the housings $H_1$ and $H_2$ toward the nozzle $N_2$ which results in an increase in the overall thrust developed in the unit.

The compressor and turbine counter-rotation stages embodied in the jet propulsion unit are so interconnected by drive shafts 31 and 26 that any variations in airplane speed, altitude, or atmospheric temperature, will automatically result in optimum compensation of the ratio of relative rotative speed of each stage to produce the highest internal and propulsive efficiency of the power plant in the presence of such external variable conditions.

With such arrangement the design ratio of entrained volumetric flow to vane rotational speed in each stage of the compressor and turbine tend to remain most constant under the influence of variable atmospheric conditions imposed upon the power plant, and individual stages of the compressor and turbine are not forced by mechanical connection to other stages to operate at incorrect angles of incidence with the passing fluid.

It is to be understood that the foregoing is not to be limiting but may include any and all forms of apparatus which are included within the scope of the claims.

I claim:

1. In a gas reaction propulsive unit, apparatus comprising in combination, a housing having a forward opening for the entrance of air and a rearward opening for discharging gases at high velocity, a turbo-compressor in said housing in communication with said forward opening and having a plurality of immediately adjacent independently counter-rotatable impeller blades, a gas turbine in said housing having a plurality of independently immediately adjacent counter-rotatable rows of impeller blades, a combustion chamber in the housing between said pluralities of adjacent blades, a plurality of concentric drive shafts coupling said rows of turbine impeller blades with said rows of compressor impeller blades, and cantilever support means between said pluralities of adjacent blades and in approximately the same radial plane as the combustion chamber for supporting said shafts in the housing, and means to discharge gases exhausted from said turbine in a propulsive jet through said rearward opening.

2. In a gas reaction propulsive unit, apparatus comprising in combination, a housing having a forward opening for the entrance of rammed air and a rearwardly directed nozzle for discharging gases at high velocity, a turbo-compressor in said housing in communication with said forward opening and having a plurality of independently counter-rotatable rows of impeller blades, a gas turbine in said housing having a plurality of independently counter-rotatable rows of impeller blades, a combustion chamber in said housing between the turbo-compressor and the turbine, a plurality of concentric drive shafts coupling individual rows of said turbine impeller blades with individual rows of said compressor impeller blades, and a shaft support cantilivered at its forward end from the housing and supporting said shafts in a zone intermediate the turbo-compressor and turbine and forming the sole support for the shafts and means to discharge gases exhausted from said turbine in a propulsive jet through said nozzle.

3. In a gas reaction propulsive unit, apparatus comprising in combination, a housing having a forward axial opening for the entrance of rammed air, and a rearwardly directed axial nozzle for discharging gases at high velocity, a turbo-compressor in said housing having an axial inlet in communication with said forward opening and having a mixed axial and radial flow compressor discharge portion and including a plurality of independently counter-rotatable rows of impeller blades positioned for mixed axial and radial flow and arranged between said inlet and discharge portion, a gas turbine in said housing having a mixed axial and radial flow entrance and including a plurality of independently counter-rotatable rows of impeller blades positioned for a mixed radial and axial flow, an axial outlet from said turbine, a combustion chamber in said housing between said compressor and turbine, and means coupling individual rows of said turbine impeller blades with individual rows of said compressor impeller blades and means to discharge gases exhausted from said turbine axially in a propulsive jet through said nozzle.

4. In a gas reaction propulsive unit, an outer housing having a forward opening for the entrance of rammed air and a rearwardly directed outlet for discharging gases in the form of a propulsive jet at a high velocity, a stationary inner housing spaced within the outer housing to leave a passageway intermediate said outer and inner housings, a forward inlet in said inner housing, streamlined struts extending radially through the forward portion of the passageway from the outer housing to the inner housing to support the latter, a turbo-compressor in said inner housing communicating with said inlet and having a plurality of immediately adjacent counter-rotatable rows of impeller blades, a gas turbine in said inner housing having a plurality of rows of independently counter-rotatable impeller blades, a combustion chamber in the inner housing between said compressor and turbine, a plurality of coaxial drive shafts extending between said turbine and said compressor, each of said shafts coupling individual rows of said turbine impeller blades with individual rows of said compressor impeller blades, means for supporting said shafts including a plurality of stationary vanes at the exit of the compressor extending substantially radially inward from the inner housing and lying in substantially the same transverse plane as said struts, and an impeller on a forward extension of one of said coaxial shafts and positioned within the forward opening of said outer housing and adapted to propel air rearwardly into the said forward inlet of the inner housing leading into said turbo-compressor and also to propel air through said annular passageway formed between said inner and outer housings.

5. In a gas reaction propulsive unit, an outer housing having a convergent-divergent forward opening for the entrance of rammed air and a rearwardly directed outlet for discharging gases in the form of a propulsive jet at a high velocity, a stationary inner housing spaced within the outer housing to leave an annular passageway intermediate said outer and inner housings, the forward end of the inner housing being adjacent and slightly rearward of the forward end of the outer housing, and the inner housing having a forward inlet in said convergent-divergent forward opening of the outer housing, a turbo-compressor in the forward end of said inner housing communicating with said inlet and having a plurality of counter-rotatable rows of impeller blades, a gas turbine in said inner housing rearward of said compressor having a plurality of rows of counter-rotatable impeller blades, a combustion chamber in the inner housing between said compressor and turbine, a plurality of coaxial drive shafts extending between said turbine and said compressor, each of said shafts coupling individual rows of turbine impeller blades with individual rows of compressor impeller blades, an impeller on a forward extension of one of said coaxial shafts and positioned within said convergent-divergent forward opening of said outer housing and adapted to propel air rearwardly into the said forward inlet of said inner housing leading into said turbo-compressor and also to propel air through said annular passageway formed between said inner and outer housings, said impeller and the foremost row of said compressor impeller blades being carried by the same shaft so as to rotate in the same direction, the portions of said inlet and outer housing lying between said impeller and said foremost row of compressor blades being unobstructed so as to provide an open cascade effect.

6. A gas reaction propulsive power unit comprising a housing having a forward opening for receiving rammed air and a rearwardly directed nozzle, a compressor in the housing communicating with the forward opening and including a plurality of independently counter-rotating rows of impeller blades, a turbine in the housing having a plurality of independently counter-rotating rows of impeller blades, a plurality of concentric drive shafts coupling the rows of turbine blades with the rows of compressor blades, a diaphragm at the rear end of the compressor supporting said shafts, stationary nozzle vanes carried by the housing and arranged at the upstream side of the turbine, a combustion chamber in the housing between the turbine and the compressor discharging the combustion gases through said nozzle vanes, the combustion chamber including an inner shroud carried cantilevered from its rear end by said nozzle vanes so as to be spaced radially outward from said shafts and rearwardly from said diaphragm to leave a cooling air space around the shafts having its forward end in communication with the compressor, and means for introducing fuel into the combustion chamber.

NATHAN C. PRICE.

REFERENCES CITED

The following references are of record in the file of this patent:

UNITED STATES PATENTS

| Number | Name | Date |
|---|---|---|
| 1,091,581 | Ljungström | Mar. 31, 1914 |
| 1,874,314 | Lasley | Aug. 30, 1932 |
| 2,024,274 | Campini | Dec. 17, 1935 |
| 2,037,880 | Charavay | Apr. 21, 1936 |
| 2,168,726 | Whittle | Aug. 8, 1939 |
| 2,256,198 | Hahn | Sept. 16, 1941 |
| 2,280,835 | Lysholm | Apr. 28, 1942 |
| 2,342,262 | Franz et al. | Feb. 22, 1944 |
| 2,354,151 | Skoglund | July 18, 1944 |
| 2,378,372 | Whittle | June 12, 1945 |
| 2,396,911 | Anxionnaz et al. | Mar. 19, 1946 |
| 2,399,046 | Larrecq | Apr. 23, 1946 |
| 2,399,865 | Halford | May 7, 1946 |
| 2,404,767 | Heppner | July 23, 1946 |
| 2,409,176 | Allen | Oct. 15, 1946 |
| 2,426,098 | Heppner | Aug. 19, 1947 |
| 2,430,399 | Heppner | Nov. 4, 1947 |
| 2,445,114 | Halford | July 13, 1948 |
| 2,477,683 | Birmann | Aug. 2, 1949 |
| 2,477,798 | Griffith | Aug. 2, 1949 |

FOREIGN PATENTS

| Number | Country | Date |
|---|---|---|
| 879,123 | France | Nov. 10, 1942 |

OTHER REFERENCES

"Jet Propulsion of Aircraft," by G. G. Smith, in Flight, issue of October 9, 1941, pages 239 and 242.